United States Patent [19]
van Wingerden et al.

[11] Patent Number: 5,366,719
[45] Date of Patent: Nov. 22, 1994

[54] METHOD OF PERFORMING A CHEMICAL REACTION AND A REACTOR FOR USE THEREWITH

[75] Inventors: Antonius J. M. van Wingerden, Apeldoorn; Andries Q. M. Boon, Utrecht; John W. Geus, Bilthoven, all of Netherlands

[73] Assignee: Veg-Gasinstituut N.V., Apeldoorn, Netherlands

[21] Appl. No.: 107,466

[22] Filed: Aug. 17, 1993

Related U.S. Application Data

[63] Continuation of Ser. No. 579,357, Sep. 7, 1990, abandoned.

[30] Foreign Application Priority Data

Sep. 8, 1989 [NL] Netherlands .................... 8902250

[51] Int. Cl.$^5$ ..................... B01J 19/00; C01B 17/16
[52] U.S. Cl. ............................... 423/659; 423/210; 423/220; 423/230; 423/573.1; 423/DIG. 6; 423/DIG. 13
[58] Field of Search ..................... 423/245.3, 230, 352, 423/576, 31, 210, 220, 659, DIG. 13, DIG. 6, 573.1; 165/104.12; 422/202, 173, 201

[56] References Cited

U.S. PATENT DOCUMENTS

| | | | |
|---|---|---|---|
| 2,205,409 | 6/1940 | Houdry | 422/201 |
| 3,431,083 | 3/1969 | Bergstrand | 422/202 |
| 3,617,227 | 11/1971 | Beggs | 23/288 M |
| 3,679,372 | 7/1972 | Hartman, Jr. et al. | 422/173 |
| 3,929,670 | 12/1975 | Kudo et al. | 252/455 R |
| 4,101,287 | 7/1978 | Sweed | 23/288 R |
| 4,193,793 | 3/1980 | Cheung | 75/235 |
| 4,423,022 | 12/1983 | Albano et al. | 423/360 |
| 4,507,274 | 3/1985 | Broecker et al. | 423/573 R |
| 4,571,325 | 2/1986 | Nikolov et al. | 422/191 |
| 4,632,587 | 12/1986 | Vollhardt | 422/202 |
| 4,765,931 | 8/1988 | Saunders et al. | 252/584 |
| 4,772,455 | 9/1988 | Izumi et al. | 423/210 |
| 4,795,618 | 1/1989 | Laumen | 422/202 |
| 5,141,720 | 8/1992 | Malmström et al. | 422/200 |
| 5,149,509 | 9/1992 | Fischer et al. | 422/177 |

FOREIGN PATENT DOCUMENTS

| | | | |
|---|---|---|---|
| 3511825 | 10/1986 | Germany . | |
| 63-20029 | 1/1988 | Japan | 422/173 |
| 8602016 | 4/1986 | WIPO . | |
| 9005577 | 5/1990 | WIPO | 422/173 |

*Primary Examiner*—Gary P. Straub
*Assistant Examiner*—Timothy C. Vanoy
*Attorney, Agent, or Firm*—Weingarten, Schurgin, Gagnebin & Hayes

[57] ABSTRACT

This invention relates to a method of conducting a chemical reaction in the presence of a heterogeneous catalyst, in which a feedstock is passed through a catalytic reactor, said reactor comprising a solid reactor bed with a catalytically active material present thereon, and at least one heat supplying and/or discharging reactor wall, and in which the catalyst bed consists of elementary particles of material sintered together and to one side of the wall, there being no sintered material present on the other side of the reactor wall, and in which the maximum distance in meters ($x_{max}$) of any point of the reactor bed to a nearest heat supplying and/or discharging wall is determined by the following formula:

$$x_{max} \leq -\frac{\lambda a'}{ai \cdot a \cdot 2} + \sqrt{\left(\frac{\lambda a'}{ai \cdot a \cdot 2}\right)^2 + \frac{\lambda \cdot \Delta T_{max}}{a \cdot q}}$$

11 Claims, 2 Drawing Sheets

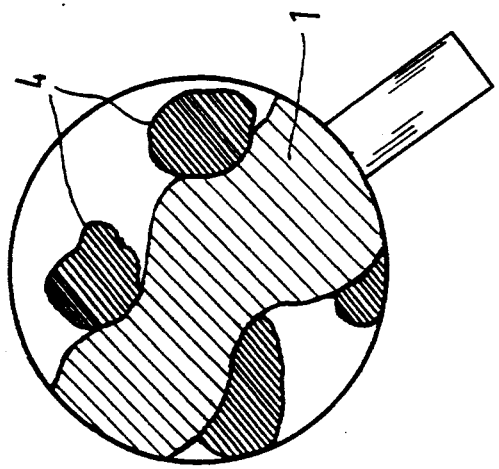
FIG. IC
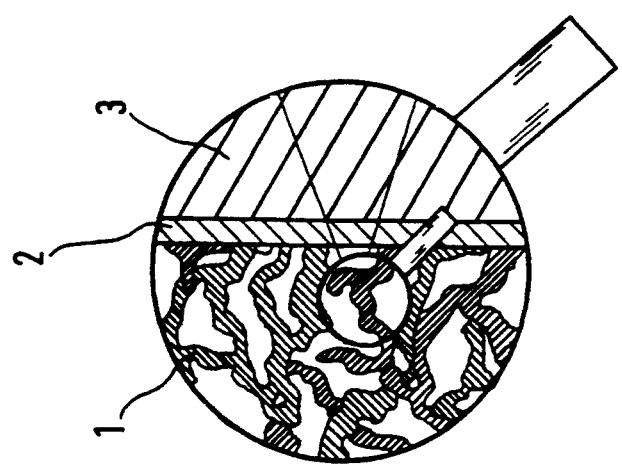
FIG. IB
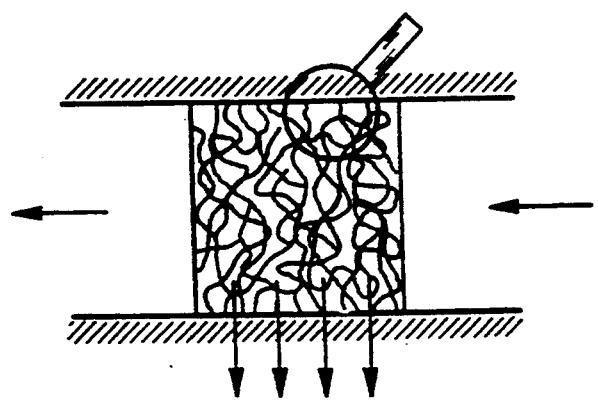
FIG. IA

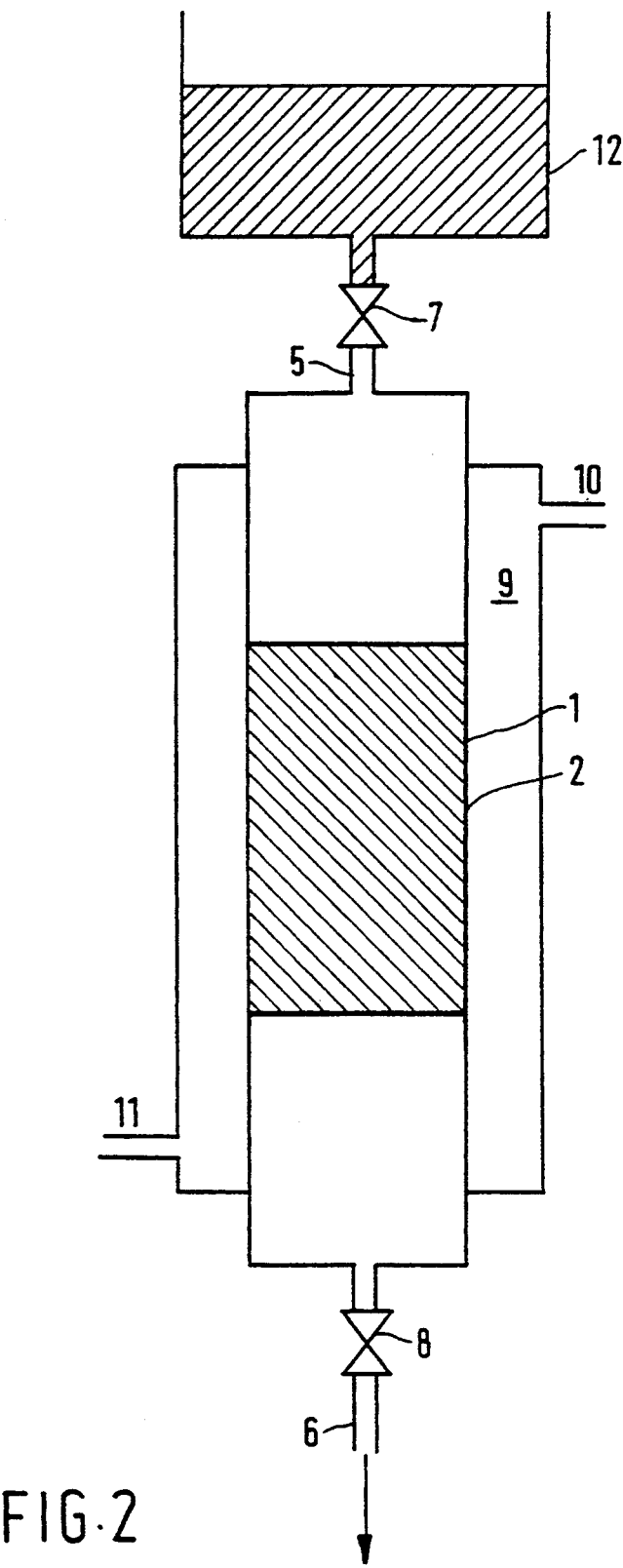
FIG·2

METHOD OF PERFORMING A CHEMICAL REACTION AND A REACTOR FOR USE THEREWITH

This application is a continuation of application Ser. No. 07/579,357, filed Sep. 7, 1990, now abandoned, entitled: A METHOD OF PERFORMING A CHEMICAL REACTION AND A REACTOR FOR USE THEREWITH.

FIELD OF THE INVENTION

This invention relates to a method of performing a chemical reaction in the presence of a heterogeneous catalyst, in which a feedstock is passed through a catalytic reactor. More specifically, the invention relates to a method in which the chemical reaction is highly exothermic or highly endothermic.

BACKGROUND OF THE INVENTION

In the most current catalytic reactors, use is made of a solid catalytic bed. In such a catalyst bed, porous bodies are poured or stacked.

In order to avoid an undesirably high pressure drop across the catalyst bed, the bodies or particles used preferably have a size of at least 0.3 mm. This minimum size of the catalyst bodies is necessary to keep the pressure drop which occurs when a stream of reactants is passed through the catalyst bed within technically acceptable limits. In addition to the dimension at lower limit dictated by the permissible pressure drop, the required activity of the catalyst imposes an upper limit upon the dimensions of the catalytically active particles. The high activity required for a number of types of technical catalysts can mostly only be achieved with an area of the active phase of 25 to 500 $m^2$ per ml. Surface areas of such an order of magnitude are only possible with very small particles, for example, with particles of 0.05 micron.

As a liquid or gas mixture cannot flow through particles of such dimensions, the minute primary particles must be formed into highly-porous bodies having dimensions of at least about 0.3 mm, which may have a large catalytic surface area. An important aim in the production of technical catalysts is to combine the required high porosity with a sufficiently high mechanical strength. The catalyst bodies must not disintegrate during the filling of the reactor and when subjected to sudden temperature differences ("thermal shock").

Under the conditions of the thermal pre-treatment and/or the catalytic reaction to be carried out, almost all catalytically active materials are rapidly sintered into large conglomerates with a negligible small active surface area. Generally speaking, therefore, the active component is applied (in finely-divided form) to a so-called carrier. This carrier has the required thermal stability and is hardly, if at all, sintered at high temperatures. Carriers mostly used are silicon dioxide, aluminium oxide or activated carbon.

A great many technical reactions are characterized by a more or less large, positive or negative, heat effect. In order that chemical reactions may proceed in the desired manner, an efficient supply or removal of the reaction heat is indispensable. Thus with some exothermic reactions, the thermodynamic equilibrium is shifted in an undesirable direction when the temperature is increased. Examples are the synthesis of ammonia and methanol, the oxidation of sulfur dioxide to sulfur trioxide in the production of sulfuric acid, the reaction of sulfur dioxide with hydrogen sulfide in the Claus process, the selective oxidation of $H_2S$ to $S$, and the reaction of carbon monoxide with hydrogen to form methane. As thermal energy is generated as these reactions proceed, the temperature of the reaction mixture will rise, and the thermodynamic equilibrium be shifted in an adverse way, unless the reaction heat generated is rapidly and efficiently removed from the reactor.

In endothermic reactions, there may also be a shift of the thermodynamic equilibrium in an undesirable direction, now by absorbing thermal energy. Examples are the methane-steam reforming and the dehydrogenation of ethyl benzene to styrene. Also, the reaction velocity may become so low that the desired reaction is not completed any longer.

In addition to a shift of the thermodynamic equilibrium in an undesirable direction, a change in temperature may adversely affect the selectivity of catalytic reactions.

Examples of reactions in which the temperature affects selectivity are the production of ethylene oxide from ethylene (the undesirable reaction is the formation of water and carbon dioxide), the selective oxidation of hydrogen sulfide to elemental sulfur (the undesirable reaction is the formation of $SO_2$), and the Fischer Tropsch synthesis. In all cases the temperature is increased as a result of the generation of reaction heat. When the rise in temperature is not prevented by rapidly removing the reaction heat, the selectivity decreases substantially.

Although, as the above examples show, there is a great need of a rapid supply or removal of thermal energy in catalytic reactors, a solid catalyst bed has a poor thermal conductivity. According to the present state of the art, it is virtually impossible to supply thermal energy to, or remove energy from, a solid catalyst bed in an efficient manner. Indeed, this is apparent from the way in which technical reactions are carried out in solid catalyst beds.

It is possible that, in an exothermic reaction, a rise in temperature only leads to a shift of the thermodynamic equilibrium in an undesirable direction, without an intolerable reduction in selectivity. In that case the reaction may be permitted to proceed adiabatically in a solid catalyst bed; naturally, this is only possible with exothermic reactions. After the passage through the reactor, the stream of reactants is cooled in a separate heat exchanger. As the conversion of the reactants is now thermodynamically limited owing to the rise in temperature in the reactor, the reactants must be re-reacted after cooling. The reaction product may be separated and the reactants recycled through the solid catalyst bed. This is effected, for example, in the synthesis of ammonia and in the methanol synthesis. If the reaction product cannot be readily separated, the heat exchanger should be followed by a second solid-bed reactor with heat exchanger. This is the case, for example, in the oxidation of sulfur dioxide to sulfur trioxide. Sometimes, in order to prevent the emission of harmful compounds, even a third reactor with heat exchanger is required. If the series-connection of a plurality of reactors and heat exchangers is not quite possible, and the separation of the reaction product is not possible either, the reaction product is sometimes recycled through the catalyst bed. In that case, so little of the reactants is added to the circulating reaction product per passage through the reactor that these are completely converted. As the rise in temperature must then be well controlled, only a small amount can be converted per pass through the reactor. In cases where the reaction must be carried out at greatly increased pressure, the problems with the supply or removal of reaction heat are even greater. In the synthesis of ammonia and the methanol synthesis, a catalyst bed is used in which reactants are injected at different points at a relatively low temperature.

Such a performance of the process, in which gas streams must be passed through high-pressure reactors in a complicated manner, naturally requires high investments.

It will be clear that none of the above-discussed technical solutions is attractive. Generally speaking, expensive equipment is required, while recycling and separation of reaction products present in low concentration require much energy. This is why, in the cases discussed, fluidized beds are often used. In a fluidized bed, the transport of thermal energy is much easier. In a fluidized bed, the catalyst to be used must satisfy very severe demands as regards mechanical strength and wear resistance, which is by no means possible with every catalyst. Finally, owing to the inevitable wear, catalyst consumption in a fluidized bed is relatively high. Indeed, in many cases it will not be possible to use a fluidized bed.

There are cases in which neither a fluidized bed nor an adiabatic reactor can be used. This is especially true of highly endothermic reactions and reactions in which selectivity is prohibitively decreased when the temperature rises. Examples are the methane-steam reforming and the selective oxidation of ethylene to ethylene oxide. In a selective oxidation of ethylene, a very large heat exchange surface area is applied by using a reactor with no fewer than 20,000 long tubes. In the methane-steam reforming process, it is endeavoured to optimize the supply of heat by adapting the dimensions and shape of the catalyst bodies. In this latter reaction, too, a large number of expensive pipes must be used in the reactor.

In certain cases, the reaction can be conducted with a catalyst suspended in a liquid with a suitable boiling point. The reaction heat is now dissipated by evaporating the liquid. In endothermic reactions, thermal energy can be supplied to the reaction system through the liquid phase. Technically, however, conducting the catalytic reaction with a catalyst suspended in a liquid phase is possible in a few cases only.

It has also been proposed to apply the catalyst exclusively to the wall of the reactor. This is the case, for example, in the performance of the Fischer Tropsch reaction, in which higher hydrocarbons are produced from a mixture of hydrogen and carbon monoxide. The catalyst applied to the wall ensures a good transfer of heat from the catalyst to the environment. One method proposed for applying the catalyst to the wall is the following. The catalyst is applied to the wall as a Raney metal, an alloy of the active metal and aluminium. After the application, the catalyst is activated by dissolving the aluminium with lye. The greater part of the reactor volume is empty, so that the contact of the reactants with the catalytically active surface is poor, and the conversion per pass through the reactor is greatly limited. For this reason the reactants must be recycled through the reactor many times.

In a number of technically important cases, the pressure drop during the passage of the reactants through the catalyst bed must be very small. This applies, for example, to reactors in which flue gas from large plants must be purified, such as in the catalytic removal of nitrogen oxides from flue gas. As a flue gas stream is generally a huge quantity, a proper pressure drop requires a great deal of mechanical energy. The same applies to the purification of automobile exhaust gases. In that case, too, a high pressure drop is impermissible.

At the present time, the only possibility of achieving an acceptable pressure drop, without unduly reducing the contact with the catalyst, is the use of catalysts applied to a honeycomb. For this purpose almost exclusively ceramic honeycombs are used, sometimes referred to a "monoliths", to which the catalytically active material has been applied. However, these ceramic honeycombs are very expensive, and their use is therefore not very attractive.

In a variant of the method in which the catalyst is applied to the wall only, monoliths built up from thin metal plates are used. Such a reactor is made, for example, by rolling up a combination of corrugated and flat thin metal plates and subsequently fixing this assembly by welding. Also, the flat plates may be stacked to form a system with a large number of channels. The catalyst is then applied to the wall of the channels thus produced. Here again, with a normal throughput, conversion is limited, because a relatively large fraction of the reactants passes the catalyst unreacted, or because the reactants require a relatively long residence time in the reactor for a sufficiently high conversion to be achieved.

As stated before, the thermal conduction in a solid catalyst bed is poor. This has been attributed to the low thermal conductivity of the high-porosity carriers supporting the catalytically active material. This is why Kovalanko, O. N. et al, Chemical Abstracts 97 (18) 151409u, have proposed to improve the thermal conduction by increasing the conductivity of the catalyst bodies. They did this by using porous metal bodies as the catalyst carrier. Now, Satterfield has already described that the thermal conductivity of a stack of porous bodies is determined not so much by the conductivity of the material of the bodies, but by the mutual contacts between the bodies (C. N. Satterfield, "Mass Transfer in Heterogeneous Catalysis", MIT Press, Cambridge, Mass., USA (1970), page 173). Measurements by the present inventors have shown that the thermal conductivity of catalyst bodies indeed does not substantially affect the transfer of heat in a catalyst bed.

In WO-A 86/02016, a reactor is described which includes a catalyst carrying reaction bed which consists of sintered metal particles which are in a good heat conducting connection with the reactor wall, which wall is provided on the outside with sintered metal particles for the discharge of reaction heat. Furthermore, a change in phase takes place on the outside of the reactor. It is found that such a reactor system is capable of realizing a discharge of large amounts of heat, but it has the disadvantage that effective adjustment and/or control of the reaction is impossible, or very difficult. This appears, inter alia, from the example, which describes the catalytic combustion of a combustible gas with a calorific value of 35,530 kJ. This should take place at a temperature of 350° C. Owing to the reactor being cooled with evaporating water (steam production) at 110° C., however, the entire reactor is cooled to 110° C., so that the reaction will fail to proceed.

There is accordingly a need for a system in which a chemical reaction, in particular one with a substantial heat effect, can be carried out in a simple manner.

SUMMARY OF THE INVENTION

According to the present invention, it has been found that reactions of the type referred to can be excellently carried out in a catalytic reactor in which the reactor bed consists of elementary particles of material sintered together and to one side of the reactor wall, but in which no sintered metal particles are present on the other side of the reactor wall. If, in such a reactor, the diameter of the reactor bed is selected in relation to the heat effects, which differ from reaction to reaction, but are known and can be calculated depending on reaction conditions, reactions of the type referred to can be carried out in an optimum manner.

The invention is based on the insight that for a catalytic reaction to be carried out on a practical scale requires the reaction to proceed within a specific temperature range. If heat must be supplied in the case of endothermic reactions and if heat must be discharged in the case of exothermic reactions, the temperature will respectively rise above, and decrease below, this temperature range. The present invention makes it possible, however, to maintain the optimum temperature by selecting the most suitable reactor system.

BRIEF DESCRIPTION OF THE DRAWING

Other features and benefits of the invention can be more clearly understood with reference to the specification and the accompanying drawings in which:

FIG. 1 schematically illustrates one embodiment of the catalyst system according to the present invention; and FIG. 2 illustrates the method of applying a catalytically active material to the fixedly-connected elementary bodies.

DESCRIPTION OF THE PREFERRED EMBODIMENT

The invention accordingly relates to a method of conducting a chemical reaction in the presence of a heterogeneous catalyst, in which a feedstock is passed through a catalytic reactor, said reactor comprising a solid reactor bed with a catalytically active material present thereon, and at least one heat supplying and/or discharging reactor wall, and in which the catalyst bed consists of elementary particles of material sintered together and to one side of the wall, there being no sintered material present on the other side of the reactor wall, and in which the maximum distance in meters ($x_{max}$) of any point of the reactor bed to a nearest heat supplying and/or discharging wall is determined by the following formula:

$$x_{max} \leq -\frac{\lambda a'}{ai \cdot a \cdot 2} + \sqrt{\left(\frac{\lambda a'}{ai \cdot a \cdot 2}\right)^2 + \frac{\lambda \cdot \Delta T_{max}}{a \cdot q}}$$

In this formula, $\lambda$ is the effective coefficient of heat conductivity in W/mK of the sintered material. The rate of heat transfer is a relatively important factor in the catalyst systems according to the invention. Naturally, the heat conductivity of the overall system, i.e., from the reactor wall to within the bed, is partly determined by the heat conductivity of the material used. Preferably, the heat conductivity is no less than 10% of the heat conductivity of the material used in the solid state; preferably, this value ranges between 10 and 75%. In absolute terms, the heat conductivity ranges between 2 and 250 W/mK.

$ai$ is the coefficient of heat transfer in $W/m^2/K$ on the reactor side of the heat supplying and/or discharging reactor wall and equals $\epsilon \alpha$, where $\epsilon$ has a value of between 1.0 and 10 and indicates the increase in heat transfer by sintering the material, and $\alpha$ is the coefficient of heat transfer from the reactor bed in the non-sintered state to the heat supplying and/or discharging reactor wall. The values for $\lambda$, $ai$ and $\alpha$ are determined by the methods indicated in Powell, R. W., "Thermal Conductivity Determination by Thermal Comparator Methods", Thermal Conductivity, Vol. 2, Academic Press, 1969; of Carslaw, H. S., Jaeger, J. C.; Conduction of Heat in Solids, Oxford University Press, 2nd Ed., 1959.

$\Delta T_{max}$, measured across a radial cross-section through the reactor bed, is the absolute value of the difference in temperature between any point in this cross-section and the nearest heat supplying and/or discharging reactor wall, the maximum permissible value of which ranges between 1 and 1000K, depending on the type of reaction and the reactor material. The value for $\Delta T_{max}$ is determined by the values for a minimum temperature Tmin and a maximum temperature Tmax, determined by external factors. The basis of a Tmin and a Tmax may vary greatly; maximum or minimum temperature to prevent side reactions and/or subsequent reactions, freezing of the equilibrium, or too low a reaction rate, unduly high pressure drop, stability, sufficiently high rise in temperature in the reactor from requirements of the subsequent unit operation, material limitations, condensation of input materials or reaction products, etc.

$a$ is a form factor determined only by the geometrical shape of the reactor. For a tube and a plate it is 0.25 and 0.5, respectively. Generally speaking, a ranges between these two values.

$a'$ is a form factor representing the ratio between the area of the reactor cross-section and the heat exchanging circumference of said reactor cross-section multiplied by $x_{max}$. Consequently, $a'$ is only dependent upon the geometry of the reactor. For a tube, $a'$ is 0.5 and for a plate 1. In Table 1, values for a and $a'$ are listed for a number of reactor geometries.

TABLE 1

| reactor form | a | a' | a'/a |
|---|---|---|---|
| tube | .25 | .5 | 2 |
| square | .29 | .5 | 1.72 |
| rectangle | | | |
| 2 × 1 | .45 | ⅔ | 1.48 |
| 4 × 1 | .497 | 4/5 | 1.61 |
| 8 × 1 | .500 | 8/9 | 1.78 |
| 16 × 1 | .500 | 16/17 | 1.88 |
| plate | .5 | 1 | 2 |

The meaning of q in the formula is the maximum reaction heat, in $W/m^3$, generated in the reactor bed and which must be supplied and/or discharged through the wall in radial direction. The value of q depends inter alia, on the catalyst activity, the load density of the catalyst, the geometry of the catalyst, and the gas composition. For a given reaction or under given reaction conditions, q can be determined in a simple manner.

If it is desired to determine $X_{max}$ in relation to the heat transported in the radial direction per m² reactor wall, the relation can be written as:

$$x_{max} \leq \lambda \cdot \frac{a'}{a} \left( \frac{\Delta T_{max}}{Q} - \frac{1}{ai} \right)$$

where a, a', λ, $\Delta T_{max}$ and ai have the above meanings, and Q is the heat transported in radial direction per m² reactor wall. The magnitude of Q depends on the heat q produced or required per unit volume and to be discharged or supplied in the radial direction, and the size of the heat-exchanging surface.

Q can be simply determined by determining the heat flux through the outside of the reactor. This heat must be discharged and/or supplied at the outside of the reactor. This can be done in various ways, depending on the temperature range dictated by the reaction and/or by external factors; for example, by means of gases and liquids, possibly in a fluidized bed, irradiation by means of infrared radiators and/or open flames, conduction through solids, etc.

In the method and the reactor according to this invention, the elementary bodies forming the solid catalyst bed, which may or may not be porous, may consist of all sorts of materials and may be formed in various ways. A first point of importance is that the particles can be fixed together, for example by sintering. The dimensions of the bodies are important, for one thing, for the pressure drop across the reactor: when the bodies are too small, the pressure drop may become too high. Determinative of the pressure drop across the catalyst bed is the pore structure of the sintered bed. The preferred starting product is, therefore, elementary bodies whose largest dimension is at least 0.3 mm.

If desired, smaller basic particles may be used, which during sintering coalesce to form larger bodies, so that yet an acceptable pressure drop is obtained. The upper limit of the size is partly determined by the degree of contact between catalyst and reactant(s), while the shape of the bodies may play a role as well.

According to a preferred embodiment of the invention, the catalyst bed is built up from more or less isotropic particles, more specifically in rather a narrow particle size distribution. When such elementary particles are used, a catalyst system with very good properties is obtained.

The material of which the elementary particles consist is preferably metal, but alternatively may be alumina, silica, silica-alumina, zeolite, titanium dioxide, zinc oxide or zirconium oxide, or oxides of a combination of elements, such as spinel ($MgA_2O_4$), mullite ($3Al_2O_3.2SiO_2$) or cordierite ($2MgO.2Al_2O_3.5SiO_2$), as well as carbides, nitrides and borides of elements, such as silicon, tungsten, titanium and vanadium. Metal or metal alloys are preferred, because elementary particles consisting of these materials can relatively easily be fixedly connected together and to the reactor wall by sintering. The metal or metal alloy may itself be catalytically active, or rendered catalytically active by a treatment, but alternatively, a catalytically active material is applied to it.

More particularly, it is possible first to apply a catalytically active component to a (highly) porous carrier, and attach the thus laden carrier to the metal or alloy surface. This latter may be of importance, if the catalytically active component must not come into direct contact with the material of the sintered bodies to prevent undesirable interaction between the material of the bodies and the catalytically active component.

Suitable metals for use in elementary particles are, among others, nickel, iron, chromium, manganese, vanadium, cobalt, copper, titanium, zirconium, hafnium, tin, antimony, silver, gold, platinum, palladium, tungsten, tantalum, and the lanthanides and actinides. The elementary particles may consist of substantially pure metal or of an alloy of two or more metals, which alloy may contain non-metallic components, such as carbon, nitrogen, oxygen, sulfur, silicon, and the like.

According to a different embodiment of the invention, the elementary particles consist of fibres of filaments, preferably with a diameter of no more than 0.5 mm, more preferably 1-250 μm. The materials of which these particles are made preferably comprise carbon and metal or metal alloys.

In the present specification, the term "reactor wall" means the physical separation between the space where the reaction takes place, that is to say, the catalyst bed, and the space where heat supply and discharge takes place. This may of course be the outer wall of the catalyst bed, but also includes, for example, the walls of channels within the bed, through which heat exchange fluid can be passed.

The wall may consist of the conventional materials known for these purposes. These walls may consist of a single layer, but alternatively, more than one layer is used, in which connection it may in particular be advantageous when the surface to which the elementary bodies must be fixedly connected enhance the adherence with the elementary bodies. One example is the use of enamel coating with ceramic elementary bodies.

The degree of porosity of the solid catalyst bed according to the invention may vary within wide limits. This porosity, that is to say, the part of the bed not occupied by fixedly-connected elementary particles, generally ranges between 20 and 90% by volume. The most suitable value depends on the desired surface area, the desired pressure drop and the rate of heat transfer in the bed. Preferred values for the porosity range between 40 and 85% by volume.

The rate of heat transfer is a relatively important factor in the catalyst systems according to the invention. Naturally, the thermal conductivity of the overall system, that is to say, from the reactor wall to within the bed, is partly determined by the thermal conductivity of the material used. Preferably, the thermal conductivity is no less than 10% of that of the employed material in the solid state; preferably, this value is between 10 and 75%. In absolute terms, the thermal conductivity is preferably between 0.2 and 300 W/m².K.

The thermal conductivity depends greatly upon the thermal conductivity of the elementary bodies used. Thus, for example, $Al_2O_3$ extrudate has a conductivity of 0.32 W/m.K, whereas a sintered body of 316 L has a value of 3-12 W/m.K. Powder of 316 L, on the other hand, has a value of 0.55, while solid material has a value of 20 W/m.K. Solid copper has a thermal conductivity of 398 W/m.K. All these values relate to the condition at room temperature. At other temperatures, the absolute value of the figures is changed, but their mutual ratios remain approximately the same.

The catalyst system according to the present invention is, in principle, applicable to any catalytic chemical reaction, but is more particularly suitable for those reactions which have a strong thermal effect, that is to say, strongly endothermic or exothermic reactions, or reactions in which the selectivity is highly temperature-dependent. In a number of technically important cases, it is desired to employ a high to very high space velocity, whereby a high pressure drop across the reactor is not regarded as a great drawback. In the presently-used solid-bed reactors, a high pressure drop with the associated high space velocity is not quite possible. If the pressure at the reactor input is raised, the catalyst may be blown or washed out of the reactor, depending on whether the reactants are gaseous or liquid. It is also possible that, at a given critical value of the pressure at the reactor input, "channelling" occurs. In that case, the catalyst particles begin to move in a given part of the reactor. It is then found that the reactants flow almost exclusively through that part of the catalyst bed that is in motion. Because, in the reactor according to the present invention, the catalyst particles are much better fixed, such a reactor permits using a much higher velocity of the reactants (and accordingly a much higher pressure drop across the reactor). Under certain conditions, this may be of great advantage. Another important advantage of fixing the catalyst bodies within the reactor is apparent in case dust is deposited on the catalyst bed. In current solid-bed reactors, the catalyst bed is clogged. The reactor must be opened and the dust layer removed. In reactors according to the present invention, a high-pressure gas pulse may be sent through the reactor in a direction opposite to that of the stream of reactants. This pressure pulse blows the dust from the catalyst bed, and so clogging can be prevented without opening the reactor, which is very attractive from a technical point of view. With solid-bed catalysts according to the state of the art, this is not possible: the catalyst bodies will be blown out of the catalyst bed along with the dust layer.

With non-sintered material, owing to the fact that the shape of the material particles does not conform to that of the reactor wall, the reactor bed has a high porosity at the wall. As a consequence, little catalyst is present at this location, and relatively much less feedstock will be reacted. This effect is enhanced still further as the high porosity gives low pressure losses, and the feedstock will preferentially flow along the wall. Sintering, however, improves the connection with the wall, and as a result the porosity is in the order of the bed material not present at the wall. In addition, where the catalyst is applied after the reactor has been filled and sintered, catalyst will also be deposited on the wall. The result of these effects is that slip-through along the wall is much less, and the overall length of the reactor may be shorter. Thus the pressure drop remains low, and there is an alternative for honeycombs.

The invention is particularly suitable for conducting highly exothermic or endothermic catalytic reactions. As an example of such a reaction, the oxidation of methane will be described. As an example of a reaction in which the selectivity is greatly determined by the temperature, the selective oxidation of hydrogen sulfide will be taken. In this case, the discharge of thermal energy is of great importance, as above a temperature of about 300° C., the oxidation of sulfur vapour to the undesirable sulfur dioxide is going to proceed. The use of a catalyst system according to the present invention makes it possible for gas streams with a hydrogen sulfide content of, for example, 10% by volume, to be very efficiently purified. The hydrogen sulfide is selectively oxidized to form elemental sulfur which by condensation is very simple to separate. As such gas mixtures cannot be properly processed in a Claus process, the invention is of particularly great importance for these purposes.

As stated before, the catalyst system according to the present invention may be catalytically active of its own, or activated by a treatment. It is also very possible, however, to apply a catalytically active material to the fixedly connected elementary bodies. For this purpose, there is first prepared a dispersion of catalytically active material, which if desired may be applied to a carrier, in a liquid, and subsequently this liquid is applied to the fixedly-connected elementary bodies in a suitable manner. This can be effected, for example, by evacuating the bed to which the catalytically active material is to be applied, and subsequently sucking the dispersion into the bed, as a result of which the bed is impregnated with the catalytically active material. The composition of the dispersion and the conditions for making the system are preferably so selected that the viscosity of the impregnating liquid is increased after the impregnation. The fact is that in this way the liquid phase can be removed from the dispersion without substantially disturbing the distribution of the catalytically active material. Moreover, in this way, a better distribution of the catalytically active material over the fixedly-connected elementary bodies is obtained. A number of methods are conceivable for increasing the viscosity of the liquid. A first method is constituted by cooling it below its solidification point, so that the entire mass becomes solid. By using a vacuum the system can then be freeze dried. Another posssibility, and one which is preferred, is constituted by incorporating a minor proportion of agar or other material having a comparable activity, in the dispersion, so that the dispersion may be introduced into the system at elevated temperature and the system may subsequently be fixed by simple cooling. Subsequently, the liquid may be removed under vacuum or otherwise, and the agar removed at elevated temperature by pyrolysis. The suitable proportion of agar is mainly determined by the wish that the liquid must be capable of becoming sufficiently viscous, or even solid. Suitable concentrations range between 0.05 and 1.0% by weight.

The catalyst systems to be used in the method according to the present invention will be explained in greater detail with reference to the accompanying drawings.

FIG. 1 schematically illustrates one embodiment of the catalyst system according to the present invention, with increasing magnification from left to right. In the left-hand drawing, the system as such is illustrated, with the reactants entering the system from the bottom, and the products leaving the system at the top. The heat produced leaves the system in accordance with the arrows shown at the left, and is discharged using a heat-exchange medium now shown.

The middle drawing is a magnification of the drawing described above, and illustrates in detail a piece of the reactor wall with fixedly-connected elementary bodies. In it, 1 indicates the matrix of fixedly-connected metal particles, 2 the reactor wall, and 3 a supplementary heat-exchange material.

The right-hand drawing illustrates a still higher magnification, and shows the location of the catalytically active particles 4 on the metal 1.

FIG. 2 illustrates in the form of a sketch the method of applying a catalytically active material to the fixedly-connected elementary bodies. In the figure, 1 indicates the fixedly-connected elementary particles and 2 the reactor wall. This wall forms part of a reactor which is provided at the top and bottom with stubs for the supply and discharge of materials. These stubs are provided with valves 7, 8. The reactor is surrounded with a jacket 9 for heat exchanging fluid, for example water. This jacket is provided with stubs 10 and 11. Inlet 5 is provided with a reservoir 12 for liquid which can be introduced into the system. For the introduction of catalytically active material into the system, the procedure is then as follows:

Valve 7 is closed and stub 6 is connected to a vacuum pump, while valve 8 is open. Contained in reservoir 12 is a dispersion of the catalytically active material to be introduced into the system in a liquid. As soon as the vacuum in the reactor is sufficient, valve 8 is closed. By opening valve 7, the dispersion is sucked into the system. As soon as there is sufficient dispersion in the system, the vacuum can be fully released, and reservoir 12 removed. The system is cooled through the jacket until the liquid is sufficiently viscous or solidified. Subsequently, the whole is dried in vacuo.

Example 1

Starting from a given reaction in which heat must be discharged or supplied, the design of a reactor will comprise the following steps.

1. Determination of the reaction, the desired temperature range, the absolute pressure, the inlet concentrations and the required conversion and the amount of feedstock.
2. Determination of the kinetic data of the catalyst used in the reaction in question. This can be done either in a trial reactor with sintered metal on which the catalyst has been deposited, or in a trial reactor with just catalysts deposited on ceramic material. In the latter case, a correction will have to be made for the changed loading of the catalyst.

All this will lead to a relation which describes or sufficiently accurately approaches the reaction rate within the ranges of temperature and partial pressures of the reactants. Generally speaking this relation will be as follows:

$$\frac{dPCi}{dt} = F(\tau, P, T, PCi) i = 1 -> n$$

where $$\frac{dPCi}{dt}$$

is the change of component i per time unit and per volume unit of reactor bed.

$\tau$ is the contact period between the reactants and the catalyst.

T is the temperature at which the reaction takes place.

$PC_i$ is the partial pressure of component i

P is the pressure of the system n is the number of reactants involved in the reaction.

3. q then follows from the product $$\frac{dPCi}{dt}$$

and $\Delta h$, with $\Delta h$ being the reaction heat released per converted pressure unit of component $c_i$.

4. In view of the composition of the feedstock and the temperature range, in conjunction with corrosion resistance, a material can be selected which the reactor is to consist of.
5. By means of the data from the supplier of the sintered material, a particle size and a pore size distribution can be selected. This is correlated to the permissible pressure drop and the required residence time in the reactor material in order that a given conversion be achieved. The length of the reactor and the average velocity at which the feedstock flows through the reactor are determined simultaneously. These will depend on the temperature, which will generally not be constant, the permitted pressure drop, and the required residence time. This step often requires an integration over the reactor length to arrive at an accurate determination of length, feedstock velocity, particle size and pore size distribution.
6. The diameter or thickness of an element of the reactor (for example a plate or a tube) can be calculated by means of the formula here given.
7. The cooling or heating means to be used must be selected on the basis of the amount of heat to be discharged or supplied and the required temperature range.
8. The number of reactor elements can be determined by means of the amount of feedstock to be processed and the amount per reactor element, which can be calculated by means of 6.

Example 2

20 g $\gamma$-$Al_2O_3$ (Al 4172, 265 $m^2/g$, pore volume 1.14 ml/g) was suspended in 750 ml deionized water of 30° C. The pH was adjusted to 5 by means of concentrated $HNO_3$. 1.95 g EDTA (ethylene diamine tetraacetic acid) was dissolved in 50 ml deionized water by dropping concentrated ammonia into it, taking care that the pH did not decrease below 4. 2.69 g $La(NO_3)_3.6H_2O$ (corresponding to an ultimate load of 5% by weight of $La_2O_3$) was dissolved in 5 ml deionized water and carefully dropped into the EDTA solution. The pH was maintained between 4 and 7 by adding dilute ammonia dropwise. The ultimate solution was poured in the aqueous suspension of $\gamma$-$Al_2O_3$. The pH was re-adjusted to 5 by adding dilute $HNO_3$ dropwise. The suspension was vigorously stirred for one hour, and the pH was kept constant by injecting dilute $HNO_3$ below the surface of the liquid. After one hour, the suspension was filtered and washed twice with 25 ml deionized water. The carrier material was then dried at 60° C. for 16 hours. The dried carrier material was calcined in the air at a temperature of 550° C. for 5.5 hours to convert the lanthanum complex into the oxidic form.

The carrier material eventually contains 3% by weight of $La_2O_3$. 15 g of this stabilized carrier was suspended in 750 ml deionized water of 30° C.

5.16 g $Cu(NO_3)_2.3H_2O$ was dissolved in 50 ml deionized water and added to the suspension. The suspension was vigorously stirred while $N_2$ was insufflated below the surface of the liquid. With concentrated $HNO_3$, the pH was adjusted to 4. By injecting a 0.5M NaOH solution (0.3 ml/min) below the surface of the liquid, the pH was increased to 12. After 16 hours, the catalyst was filtered and washed twice with 25 ml deionized water. The catalyst was dried at 60° C. for 23 hours.

This catalyst was subsequently ground and sieved with a 25 μm mesh sieve. The powder was suspended in water to form a 10 wt. % mixture, and the pH was adjusted to 5. Then 0.25% by weight of agar (pro analysi) was added to this mixture. It was heated on a water bath to 90° C. and then maintained at this temperature for a minimum period of 2 minutes to allow the agar to dissolve completely.

Thereafter a steel pipe containing a porous metal (316 L) body with pores of a size greater than 100 μm, was heated in a water bath of at least 90° C.

This porous metal body had been previously obtained by sintering elementary particles essentially consisting of metal powder (316 L) with a particle size of about 500 μm together and to the wall. During the heat treatment, the porous material was evacuated to 15 mm Hg. Subsequently, the above mixture containing the catalyst, while still warm, was let into the pipe with porous material. After the suspension had been let into the porous body, the whole was maintained at a temperature of at least 90° C. for such a long time that the suspension appeared at the bottom of the porous body. Thereafter the porous body thus impregnated was cooled to room temperature. This was followed by a waiting period of 2 hours to ensure that the agar had gelled the suspension. Thereafter all suspension not present in the body was removed. Subsequently the body was dried overnight in a vacuum of substantially less than the vapour pressure of water at room temperature (15 torr). To accelerate the drying process, the tube may be heated in vacuo below the melting point of the solidified suspension (up to maximally 40° C.). Finally, the agar was burnt by heating the porous metal body in air to above 450° C.

With a throughflow resulting in a pressure drop of 1 atmosphere, less than 1% of the impregnated catalyst was blown out.

Measurements at a space velocity of 6000/hour showed that the activity of the catalyst for the combustion of natural gas had hardly decreased as a result of the impregnation here described.

Example 3

Selective oxidation of $H_2S$ to elemental sulfur.

For the manufacture of the reactor, a steel pipe was used. In it, metal particles of an iron-chromium alloy were introduced, with the composition being 80% iron and 20% chromium. The metal particles had a size of 900 to 2000 μm. The alloy powder poured into the tube was densified by vibration and then sintered in a hydrogen atmosphere at 1200° C. for 10 hours. This resulted in a porous metal body rigidly anchored in the tube.

The reactor was then heated at 800° C. for 16 hours, while air was passed through it. As a result of this treatment, the activity of the surface for the formation of sulfur dioxide disappeared.

Subsequently, in the manner described in Example 2, the catalytically active component was applied to the pre-treated alloy. The active component consisted of $\alpha$-$Al_2O_3$, to which 5% of $Fe_2O_3/Cr_2O_3$ with an Fe/Cr ratio of 9/1 had been applied. The specific area of the $\alpha$-$Al_2O_3$ was 6.5 $m^2$ per g. This active component was loaded into the reactor in a proportion of 600 kg per $m^3$ catalyst bed volume.

If 16 $m^3$/sec of a gas containing 5% $H_2S$ is oxidized by reaction by means of the above catalyst to convert the $H_2S$ into S, the conventional system can be compared with a reactor according to the present invention.

If both catalysts, that is to say, a conventional catalyst with non-sintered ceramic material and one applied to sintered metal (aluminium) according to the present invention, are introduced into tubular reactors and the reaction proceeds at 300° C. then by means of the data of Table 2, which also lists the results, the tube diameter can be calculated. $\alpha T_{max}$ is set at 25° C. in connection with two undesirable effects. At a lower temperature the equilibrium conversion is unduly low. At higher temperatures, the subsequent reaction starts, in which S is oxidized to form $SO_2$.

TABLE 2

|  | Unit | Conventional | According to this invention |
| --- | --- | --- | --- |
| $\Delta T_{max}$ | K | 25 | 25 |
| q | W/$m^3$ | 9 | 0.9 |
| $\alpha i$ | W/$m^2$K | 59 | 500 |
| $\lambda$ | W/mK | 0.39 | 65 |
| a (tube) | — | 0.25 | 0.25 |
| a' (tube) | — | 0.5 | 0.5 |
| $x_{max}$ | m | $3.2 \cdot 10^{-4}$ | 0.025 |
| Q | W/$m^2$ | 1440 | 11250 |

The diameter of 0.64 mm which results for the conventional case is so small that a reactor cannot be designed in this way. The only alternative is, therefore, to connect free adiabatic reactors in series, where the gas enters at a temperature of 200° C. and where, as a result of the reaction, the temperature rises to 300° C. After each adiabatic reactor, a heat exchanger must be connected, in which the temperature is again lowered to 200° C.

Example 4

A conventional ethylene oxidation reactor consists of 20,000 tubes with a diameter of 0.02 m. As the gas is blown through it at a high velocity (20 m/sec), the coefficient of heat transfer is mainly determined by this velocity. The value for $\alpha i$ can then be estimated to be 1000 W/$m^2$K. $\lambda$ has been estimated to be 0.39 W/mK.

By means of the formula with which $X_{max}$ can be calculated, so conversely, the quotient $$\frac{\Delta T_{max}}{q} = 6.91 \cdot 10^{-5},$$

which is not known from the open literature, can be calculated.

By means of the values for sintered metal consisting of aluminium with $\alpha i = 500$ W/$m^2$K and k=65 W/mK, $x_{max}$ can be calculated for a reaction according to this invention as being 0.0567 m.

The diameter of these tubes should then be 11.3 cm. This means that, instead of 20,000 tubes, only 630 are required.

We claim:

1. A method of conducting a chemical reaction in the presence of a heterogeneous catalyst, said method comprising the steps of:
   a. selecting a heterogeneous catalyst for use in a catalytic reactor;
   b. forming said catalytic reactor so as to include at least one heat supplying and/or discharging reactor wall having an inside surface and an outside surface and defining a reactor volume;
   c. forming a solid reactor bed comprising elementary particles of carrier material sintered together to form sintered material and having said heterogeneous catalyst applied thereon, said sintered material being sintered to the inside surface of the reactor wall and substantially filling said reactor volume, there being no sintered material present on the outside surface of the reactor wall; said reactor bed being formed such that the maximum distance in meters ($X_{max}$) of any point of the reactor bed to a nearest heat supplying and/or discharging reactor wall is determined by the following formula:

$$X_{max} \leq -\frac{\lambda a'}{ai \cdot a \cdot 2} + \sqrt{\left(\frac{\lambda a'}{ai \cdot a \cdot 2}\right)^2 + \frac{\lambda \cdot \Delta T_{max}}{a \cdot q}}$$

in which
  $\lambda$ is the effective coefficient of heat conductivity in W/mK of the sintered catalyst and has a value between 2 and 250;
  $ai$ is the coefficient of heat transfer in W/m²/K on the inside surface of the heat transferring reactor wall and equals $\epsilon\, a$, where $\epsilon$ has a value of between 1.0 and 10 and indicates the increase in heat transfer by sintering the catalyst, and $a$ is the coefficient of heat transfer from the reactor bed in the non-sintered state;
  $\Delta T_{max}$, measured across a radial cross-section through the reactor bed, is the absolute value of the difference in temperature between any point in this cross-section and the nearest heat transferring reactor wall, the maximum permissible value of which ranges between 1 and 1000K;
  a is a form factor determined only by the geometrical shape of the reactor and has a value between 0.25 and 0.5, respectively;
  a' is a form factor representing the ratio between the area of the reactor cross-section and the heat exchanging circumference of said reactor cross-section multiplied by $X_{max}$ and has a value between 0.5 and 1; and
  q is the maximum reaction heat, in W/³, generated in the reactor bed and which must be transferred through the reactor wall in a radial direction;
4. positions said catalytic reactor within an outside heat exchanger; and
5. passing a feedstock through said catalytic reactor.

2. A method of conducting a chemical reaction in a feedstock in the presence of a heterogeneous catalyst, said method comprising the steps of:
  1) constructing a catalytic reactor by a method comprising the steps of:
    a) selecting a heterogeneous catalyst for use in said catalytic reactor;
    b) forming at least one heat transferring reactor wall having an inside surface and a outside surface and defining a reactor volume; and
    c) forming a catalytic solid reactor bed from elementary particles of said heterogeneous catalyst sintered together to form sintered material and sintered to the inside surface of the reactor wall and substantially filling said reactor volume, there being no sintered material present on the outside surface of the reactor wall,
  said catalytic solid reactor bed being constructed such that the maximum distance in meters ($X_{max}$) of any point of the catalytic solid reactor bed to a nearest heat transfer reactor wall is determined by the following formula:

$$X_{max} \leq -\frac{\lambda a'}{ai \cdot a \cdot 2} + \sqrt{\left(\frac{\lambda a'}{ai \cdot a \cdot 2}\right)^2 + \frac{\lambda \cdot \Delta T_{max}}{a \cdot q}}$$

in which
  $\lambda$ is the effective coefficient of heat conductivity in W/mK of the sintered catalyst and has a value between 2 and 250;
  $ai$ is the coefficient of heat transfer in W/m²/K on the inside surface of the heat transferring reactor wall and equals $\epsilon\, a$, where $\epsilon$ has a value of between 1.0 and 10 and indicates the increase in heat transfer by sintering the catalyst, and $a$ is the coefficient of heat transfer from the reactor bed in the non-sintered state;
  $\Delta T_{max}$, measured across a radial cross-section through the reactor bed, is the absolute value of the difference in temperature between any point in this cross-section and the nearest heat transferring reactor wall, the maximum permissible value of which ranges between 1 and 1000K;
  a is a form factor determined only by the geometrical shape of the reactor and has a value between 0.25 and 0.5, respectively;
  a' is a form factor representing the ratio between the area of the reactor cross-section and the heat exchanging circumference of said reactor cross-section multiplied by $X_{max}$ and has a value between 0.5 and 1; and
  q is the maximum reaction heat, in W/m³, generated in the reactor bed and which must be transferred through the reactor wall in a radial direction;
  2) positioning said catalytic reactor within an outside heat exchanger; add
  3) passing said feedstock through said catalytic solid reactor bed.

3. A method as claimed in claim 1 or 2, characterized in that the maximum distance in meters ($x_{max}$) of any point of the reactor bed to the nearest heat supplying and/or discharging wall is determined by the formula $$x_{max} \leq \lambda \cdot \frac{a'}{a} \left(\frac{\Delta T_{max}}{Q} - \frac{1}{ai}\right)$$

where a, a', $\lambda$, $\Delta T_{max}$ and $ai$ have the above meanings, and Q is the heat transported in radial direction per m² reactor wall.

4. A method as claimed in claim 1 or 2, wherein the elementary particles are substantially isotropic.

5. A method as claimed in claim 1 or 2, wherein the elementary particles consist of filaments or fibres.

6. A method as claimed in claim 1 or 2, in which the chemical reaction is highly exothermic or highly endothermic.

7. The method as claimed in claim 6, in which the chemical reaction is a selective $H_2S$ oxidation.

8. The method as claimed in claim 6, in which the chemical reaction is a catalytic combustion or catalytic synthesis.

9. A method as claimed in claim 9, in which a gas mixture containing more than 3% by volume of $H_2S$ is subjected to selective $H_2S$ oxidation in which $H_2S$ is substantially 10. The method of claim 1 or 2 wherein said outside heat exchanger is a fluidized bed.

11. A product formed by the method of conducting a chemical reaction a feedstock in the presence of a heterogeneous catalyst, said method comprising the steps of:
1) constructing a catalytic reactor by a method comprising steps of:
   a) selecting a heterogeneous catalyst for use in said catalytic reactor;
   b) forming at least one heat transferring reactor wall having an inside surface and a outside surface; and
   c) forming a catalytic solid reactor bed from elementary particles of said heterogeneous catalyst sintered together and to the inside surface of the reactor wall, there being no sintered catalyst present on the outside surface of the reactor wall, said catalytic solid reactor bed being constructed such that the maximum distance in meters ($X_{max}$) of any point of the catalytic solid reactor bed to a nearest heat transfer reactor wall is determined by the following formula $$X_{max} \leq -\frac{\lambda a'}{\alpha i \cdot a \cdot 2} + \sqrt{\left(\frac{\lambda a'}{\alpha i \cdot a \cdot 2}\right)^2 + \frac{\lambda \cdot \Delta T_{max}}{a \cdot q}}$$

in which $\lambda$ is the effective coefficient of heat conductivity in W/mK of the sintered catalyst and has a value between 2 and 250;

$\alpha i$ is the coefficient of heat transfer in W/m²/K on the inside surface of the heat transferring reactor wall and equals $\epsilon\, \alpha$, where $\epsilon$ has a value of between 1.0 and 10 and indicates the increase in heat transfer by sintering the catalyst, and $\alpha$ is the coefficient of heat transfer from the reactor bed in the non-sintered state;

$\alpha T_{max}$, measured across a radial cross-section through the reactor bed, is the absolute value of the difference in temperature between any point in this cross-section and the nearest heat transferring reactor wall, the maximum permissible value of which ranges between 1 and 1000K;

a is a form factor determined only by the geometrical shape of the reactor and has a value between 0.25 and 0.5, respectively;

a' is a form factor representing the ratio between the area of the reactor cross-section and the heat exchanging circumference of said reactor cross-section multiplied by $X_{max}$ and has a value between 0.5 and 1; and q is the maximum reaction heat, in W/m³, generated in the reactor bed and which must be transferred through the reactor wall in a radial direction; and 2) passing said feedstock through said catalytic solid reactor bed.

* * * * *

UNITED STATES PATENT AND TRADEMARK OFFICE
CERTIFICATE OF CORRECTION

PATENT NO. : 5,366,719
DATED : Nov. 22, 1994
INVENTOR(S) : Antonius J.M. van Wingerden, et al.

It is certified that error appears in the above-indentified patent and that said Letters Patent is hereby corrected as shown below:

Column 7, line 53, "spinel ($MgA_2O_4$)," should read --spinel ($MgAl_2O_4$),--.

Column 14, line 7, "$\alpha T_{max}$ is set" should read --$\Delta T_{max}$ is set--.

Column 14, line 50, "and k=65 W/mK," should read --and $\lambda$=65 W/mK,--.

Column 15, line 41, "in $W/^3$," should read --in $W/m^3$,--.

Column 15, line 44, "positions said" should read --positioning said--.

Column 16, line 37, "heat exchanger; add" should read --heat exchanger; and--.

Column 16, line 68, "substantially" should read --substantially converted to sulphur.--.

"Column 17, line 23, "formula" should read --formula:--.

Signed and Sealed this

Nineteenth Day of September, 1995

Attest:

BRUCE LEHMAN

Attesting Officer    Commissioner of Patents and Trademarks